G. A. STARKWEATHER.
SHOCK ABSORBER.
APPLICATION FILED JAN. 29, 1918.
1,281,686.
Patented Oct. 15, 1918.
2 SHEETS—SHEET 1.
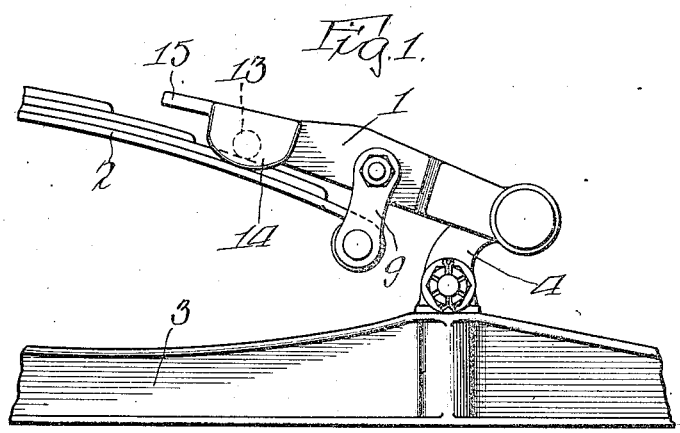
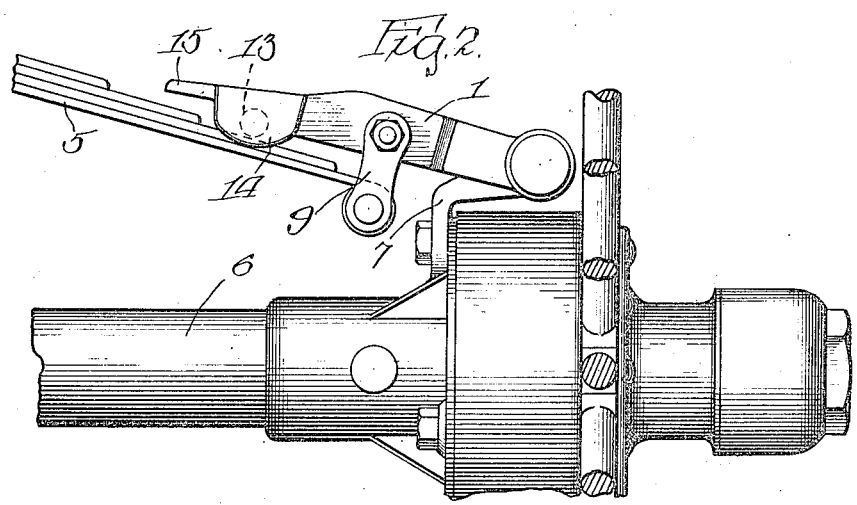
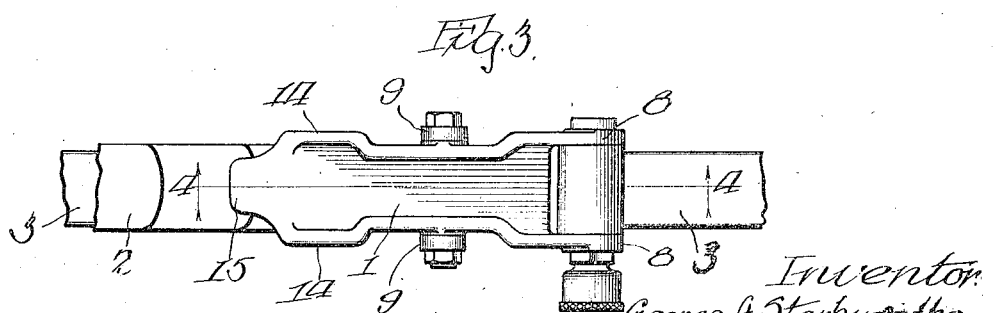
Inventor
George A. Starkweather
Brown & Nisen
Attys
Witness:
Leo F. Dinhaus G. A. STARKWEATHER.
SHOCK ABSORBER.
APPLICATION FILED JAN. 29, 1918.
1,281,686.
Patented Oct. 15, 1918.
2 SHEETS—SHEET 2.
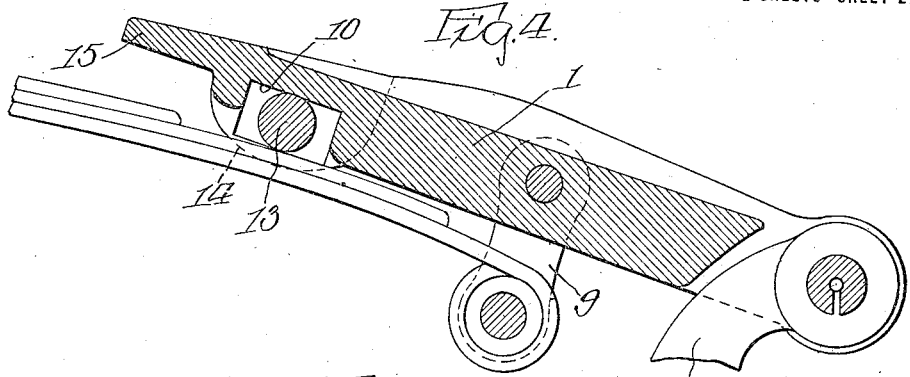
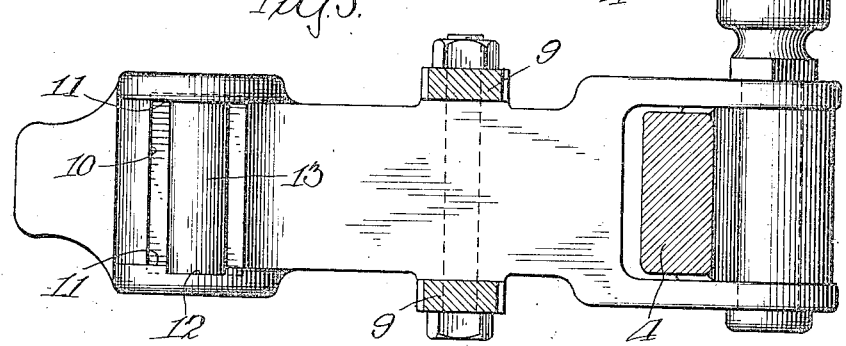
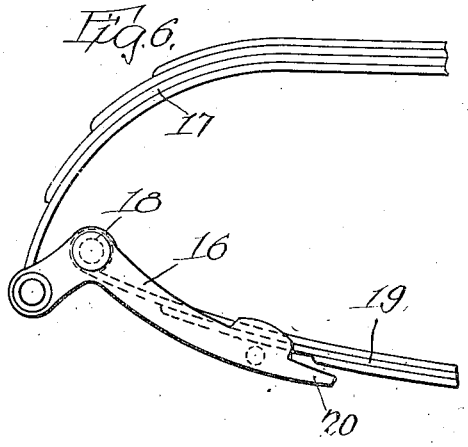
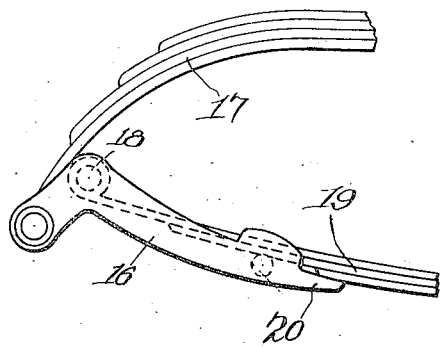
Witness:
Leo F. Dumais
Inventor:
George A. Starkweather
Brown & Darby
Attys.

UNITED STATES PATENT OFFICE.

GEORGE A. STARKWEATHER, OF FORT MADISON, IOWA, ASSIGNOR TO STARKWEATHER-SNOOK CORPORATION, OF FORT MADISON, IOWA, A CORPORATION OF IOWA.

SHOCK-ABSORBER.

1,281,686.    Specification of Letters Patent.    Patented Oct. 15, 1918.

Application filed January 29, 1918. Serial No. 214,263.

*To all whom it may concern:*

Be it known that I, GEORGE A. STARKWEATHER, a citizen of the United States, residing at Fort Madison, in the county of Lee and State of Iowa, have invented certain new and useful Improvements in Shock-Absorbers, of which the following is a specification.

This invention relates to an improved shock absorber, particularly designed for use upon motor vehicles and may be interposed between the adjacent ends of the vehicle spring sections, or between the running gear frame and the end of a spring section for flexing the portion of one spring section adjacent the end, so that the flexibility of this portion of the spring will be brought directly into operation for cushioning the load.

A further object of the invention is to provide a construction in which the leverage of the cushioning lever will be changed upon the flexing movement of the spring under a severe shock, to absorb the shock.

The invention consists in the novel construction, combination and arrangement of the parts, and further objects will hereinafter appear.

In the accompanying drawings—

Figure 1 is a side elevation showing the shock absorber as applied to the end of a leaf spring at the front of a well-known type of vehicle.

Fig. 2 is a side elevation of the same type of shock absorber applied to a rear spring of a vehicle.

Fig. 3 is a top view of the shock absorber in Fig. 1.

Fig. 4 is a sectional view of the shock absorber taken on line 4—4 of Fig. 3.

Fig. 5 is a view of the shock absorber from the under side thereof; and

Figs. 6 and 7 are views of a modified form of shock absorber applied to the adjacent ends of two spring sections, Fig. 7 showing the position of the same parts as in Fig. 6, but under load.

In ordinary automobile construction the ends of the springs are connected directly to the running gear frames, or in the type of spring shown by Figs. 6 and 7, the ends of the spring sections are directly connected to each other. In the present invention, a cushioning lever is interposed either between the spring sections, or between the frame and the end of the spring, and is provided with means for engaging the spring so that as the load upon the spring is increased, the extremity of the spring, that is, the part where there is greatest flexibility is made to flex under the load, so that the spring itself will be given greater flexibility and will have an increased tendency to cushion sharp or sudden shocks which may be imposed upon the spring. The present invention also provides means for limiting the extent of this flexing movement, so that under heavy loads the end of the spring will not be unduly bent.

In Figs. 1 and 2, the same type of shock absorber 1 is shown interposed between a front spring 2 and a front axle 3, where it is pivoted to a supporting bolt 4, and between a rear spring 5 and the rear axle 6 of the running gear frame, upon which it is supported by a bracket 7. In both cases the cushioning lever is pivoted by means of the ears 8 at the end thereof to a support attached to the running gear frame, and is connected intermediate its ends by means of links 9 with the extremity of the spring. In some cases these links may be the ones which are ordinarily or normally employed to connect the extremity of the spring with the support from the running gear frame. It is obvious, for example, that the supporting bolt 4 and the bracket 7 may be simply reversed in direction for connection to the links 9 respectively.

In the under side of the cushioning lever, adjacent its other or free end, is a recess 10, which is shown cut under the edges 11, except that at one side there is an opening 12 of substantially the width of a roller 13 which is adapted to be seated in the recess by placing one end under the edge 11 at the opposite side, and dropping the other end of the roller through the opening 12. The sides 14, adjacent the recess 10, extend somewhat beyond the recess itself and form a means for engaging the adjacent edges of the spring leaves for holding the lever in place, and the roller 13 bears against the surface of the spring, preferably against a different leaf than that to which the shock absorber is directly connected by the links 9. The free extremity 15 of the cushioning lever is normally spaced from the surface of the spring, but when the spring is flexed under a considerable load, or upon a sudden shock, this extremity 15 is adapted to engage with the surface of the spring at a greater distance from the end to which the shock absorber is connected in order to prevent any greater flexure of the spring, thereby preventing it from undue bending adjacent the end, and from subsequent crystallization and weakening due to such bending. This extremity 15 is also preferably spaced so that it engages another different leaf of the spring, thereby causing the effect to be more distributed.

In the modification shown by Figs. 6 and 7, a lever 16 is substituted for that previously shown, in which the connecting links 9 are omitted; in other respects, however, the action is just about the same; one end of a spring section 17 is connected to one extremity of the cushioning lever 16, and adjacent to this end is a pivot 18 upon which the extremity of another spring section 19 is connected. Adjacent the other or free end of the lever is a roller in a recess which bears against the under side of the spring section 19, as previously explained, and an extremity 20 is disposed adjacent one of the spring leaves to engage it when the spring is flexed. In operation under load it will be observed that the spring section 17 is flattened out which causes the cushioning lever 16 to flex the lower spring 19 until it too is flattened out, as shown in Fig. 7.

In the operation of both of these forms it will be observed that as the load is placed upon the spring there will be a tendency of the cushioning lever to move relatively to the spring, and the roller 13 is, therefore, provided to facilitate this movement. This also distributes the bending or flexing action of the spring, so that it is not extremely localized, as the constant bending at a single point tends to weaken a spring. Also in both forms the flexing action is limited by the engagement of the extremity of the cushioning lever with the spring itself.

I claim:—

1. The combination with a vehicle running gear frame and a support thereon, of a leaf spring and a link pivotally connected at one end to the end of the spring, and a shock absorber comprising a rigid lever pivoted at one end to the support and pivotally connected intermediate its ends to the other end of said link and slidably bearing on one side of the spring and the other end of the lever slidably bearing on one side of the spring to variably flex that portion of the spring between the bearing surface and the end of the spring.

2. The combination of a vehicle spring suspension comprising a support, a leaf spring, and a pair of links pivoted at their ends to the end of the spring; of a rigid lever which is interposed between the links and the support, being pivoted at one end to the support, the links being pivoted at the opposite sides of the lever intermediate its ends; and means to form a frictionless engagement with the spring at the other end of the lever.

3. The combination of a vehicle spring suspension comprising a leaf spring, a supporting member therefor, and a shock absorber comprising a rigid lever pivoted at one end to the said member and pivotally connected intermediate its ends with the end of the spring and having its other end bearing upon one side of the spring adjacent the end thereof.

4. The combination with a vehicle spring suspension comprising a leaf spring, of a supporting member therefor, links pivoted at one end to the end of the spring, and a shock absorber comprising a rigid lever pivoted at one end to the supporting member and pivotally connected intermediate its ends with the other ends of said links, the links being connected one on each side of the lever upon the same pivotal axis and the lever having its other end bearing upon one side of the spring adjacent the end thereof.

5. In a vehicle spring shock absorber, a rigid lever having ears for pivotal attachment at one end, means for pivotal attachment intermediate the ends, and an undercut recess at the other end; and a roller adapted to be loosely seated in the recess and covered and retained therein by the undercut portion.

6. The combination with a vehicle spring and a running gear support therefor, of a shock absorber comprising a lever pivotally connected to the support at one end and to the spring intermediate the ends of the lever, the lever having a recess at one end, and a roller loosely seated therein bearing on the spring, the recess being wider than the diameter of the roller to make a rolling contact with the spring as it is flexed.

7. A vehicle spring shock absorber comprising a rigid lever with means for pivotally connecting it at one end and intermediate the ends, and with a recess at the other end having undercut edges except for a portion the diameter of the roller at one edge thereof, and a roller adapted to be loosely seated in the recess and of a diameter less than the width of the recess permitting it to be inserted therein because of the portion not undercut and retained in the recess by the undercut edges.

8. The combination with a spring and a running gear support therefor, of a shock absorber comprising a rigid lever pivoted at one end to the support and intermediate its ends to the end of the spring, the lever having an undercut recess with sides adapted to engage the edges of the spring to hold the lever in place thereon, and a roller loosely seated in the recess for rolling movement therein and adapted to contact with the spring between said sides, the roller being entirely inclosed and covered by the recess and the spring.

9. A shock absorber for vehicle leaf springs, including a lever connected at one end to the vehicle and intermediate the ends to the end of the spring, and means near the other end of the lever for bearing against the spring near its end, the said other end of the lever being spaced from the spring and engaging it only when the end of the spring is flexed by the lever under load.

10. The combination with a vehicle running gear frame and spring, of a shock absorber therefor including a lever pivoted at one end to the frame and intermediate its ends to the end of the spring, and having a portion adjacent the other end for normally engaging and flexing the extremity of the spring under load and the said other end being normally spaced from the spring but engaging it when it is sufficiently flexed at a greater distance from the end of the spring.

11. The combination with a vehicle leaf spring, of a shock absorber therefor including a rigid lever pivoted at one end and connected intermediate the ends to the end of the spring and having a recess at the other end, and a roller loosely carried by the lever in the recess at the other end and bearing upon one side of the spring to make a rolling contact therewith as the spring is flexed under load by the lever, and flexing the end of the spring from the roller outward more than the other portion thereof.

12. The combination with a vehicle running gear frame and a leaf spring, of a shock absorber including a lever pivoted at one end to the frame and connected intermediate its ends to the end of the outermost spring leaf, and a roller carried by the lever and normally bearing against another spring leaf, the adjacent free end of the lever being normally spaced from the spring but adapted when the spring is flexed a predetermined amount to engage still another leaf of the spring at a greater distance from the end thereof.

In testimony whereof I have signed my name to this specification, on this 23d day of January A. D. 1918.

G. A. STARKWEATHER.